United States Patent
Eyer et al.

(10) Patent No.: US 8,087,043 B2
(45) Date of Patent: Dec. 27, 2011

(54) EXTENSIBLE DOWNLOADABLE CONTENT ADVISORY SYSTEM

(75) Inventors: Mark Eyer, Woodinville, WA (US); Gomer Thomas, Princeton Junction, NJ (US); Jae Hyung Song, Seoul (KR)

(73) Assignees: Sony Corporation, Tokyo (JP); Sony Electronics, Inc., Parkridge, NJ (US)

( * ) Notice: Subject to any disclaimer, the term of this patent is extended or adjusted under 35 U.S.C. 154(b) by 342 days.

(21) Appl. No.: 12/176,178

(22) Filed: Jul. 18, 2008

(65) Prior Publication Data
US 2009/0265731 A1    Oct. 22, 2009

Related U.S. Application Data

(60) Provisional application No. 60/951,715, filed on Jul. 25, 2007, provisional application No. 61/011,441, filed on Jan. 16, 2008.

(51) Int. Cl.
*H04N 7/16* (2006.01)
*H04N 5/445* (2011.01)

(52) U.S. Cl. .......................................... 725/28; 725/50

(58) Field of Classification Search .................... 725/25, 725/28, 50
See application file for complete search history.

(56) References Cited

U.S. PATENT DOCUMENTS

| | | | |
|---|---|---|---|
| 6,529,526 B1 | 3/2003 | Schneidewend | |
| 2005/0166227 A1 | 7/2005 | Joshi | |
| 2007/0180462 A1* | 8/2007 | Shin et al. | 725/28 |
| 2007/0204289 A1* | 8/2007 | Kim | 725/28 |
| 2007/0220541 A1 | 9/2007 | Kim | |

* cited by examiner

*Primary Examiner* — James R Sheleheda
(74) *Attorney, Agent, or Firm* — Trellis IP Law Group, PC

(57) ABSTRACT

A region rating table includes a number of rating dimensions and a number of rating levels. The rating dimensions may be identified by an index. Also, one or more rating level tags are added to the rating levels. The rating level tags identify each rating level within a rating dimension uniquely. The rating region table may be downloaded to the receiver for the user to set blocking preferences. A content advisory description may be specified. When content is received, it is analyzed to determine if it should be blocked based on the dimension index and the rating level tag. If the content is acceptable, it is not blocked, and if it is not acceptable, then it is blocked. Using the rating level tag to identify a rating level within a dimension allows changes to be made to the region rating table without creating unwanted blocking behavior and viewer confusion.

20 Claims, 7 Drawing Sheets

| | 202-0 | 202-1 | 202-2 | 202-3 |
|---|---|---|---|---|
| 204-0 | Violence | Sexual content | Age | MPAA rating |
| 204-1 | Mild | Mild | 7  206-0  0xA1 | G |
| 204-2 | Medium | Medium | 13  206-1  0xB1 | PG |
| 204-3 | Excessive | Excessive | 16  206-2  0xC1 | PG-13 |
|  |  |  | 18  206-3  0xD1 | R |

*Fig. 2A*

| | 202-0 | 202-1 | 202-2 | 202-3 |
|---|---|---|---|---|
| 204-0 | Violence | Sexual content | Age | MPAA rating |
| 204-1 | Mild | Mild | 7  206-0  0xA0 | G |
| 204-2 | Medium | Medium | 10  206-4  0xF1 | PG |
| 204-3 | Excessive | Excessive | 13  206-1  0xB1 | PG-13 |
|  |  |  | 16  206-2  0xC1 | R |
|  |  |  | 18  206-3  0xD1 |  |

*Fig. 2B*

EXTENSIBLE DOWNLOADABLE CONTENT ADVISORY SYSTEM

CROSS REFERENCES TO RELATED APPLICATIONS

This application claims priority from U.S. Provisional Application No. 60/951,715, filed on Jul. 25, 2007, in the name of inventors Jae Hyung SONG, titled "METHOD FOR TRANSMITTING A DATA, BROADCASTING RECEIVER AND METHOD FOR RECEIVING A BROADCASTING SIGNAL" and U.S. Provisional Patent Application Ser. No. 61/011,441, entitled EXTENSIBLE DOWNLOADABLE CONTENT ADVISORY SYSTEM, filed on Jan. 16, 2008, both of which are hereby incorporated by reference as if set forth in full in this application for all purposes.

BACKGROUND

Particular embodiments generally relate to content advisory systems.

In digital and video broadcast, a content advisory system may be used to block what is considered to be objectionable content. A user may define preferences to block content based on ratings provided for the content. A "rating table" may be used that defines the ratings for a given country or geographic region. Such a regionalized rating table is called a Rating Region Table (RRT), or a region rating table. A rating table may be considered to have columns representing rating "dimensions," where each dimension represents a different characteristic of the program content. Examples of rating dimensions include the amount and intensity of violence or sexual content, or the minimum age of the viewer. Each dimension may have a number of different rating "levels," so that, for example, a number of different levels of violent content can be represented. For a violence dimension, rating levels could be "mild violence," "moderate violence," and "extreme graphic violence."

A user may set preferences to block content by defining which ratings are acceptable. For example, a user may want to block any content that is age-rated at an age of 13 or above. The blocking limits are set using an index value that points to the column and row in the rating table. For example, the index value of (2, 1) corresponds to the rating defined by the column number 2 and row number 2. This index may correspond to an age of 13 or above in the rating table. At some point, the rating table may be changed in which dimensions or levels may be added or deleted. For example, the row of the age of 13 or above may be shifted to the index (2, 2) because a new age of 10 is added at index (2, 1). Because the user sets the preferences as a hard code to an index value, the content blocked is still at (2, 1), which is not age 13 or above. For example, it may now be a newly added level of age 10 or above.

SUMMARY

Particular embodiments generally relate to content advisory systems. In one embodiment, a region rating table is generated. The region rating table includes a number of rating dimensions, each with one or more rating levels. The rating dimensions may be considered columns of the table and the rating levels may be found in the rows of the table. Different dimensions may correspond to different parameters, such as violence, age, sexual content, etc. The rating level may be an indication of the level of how much of the parameter is included in the content, examples of those being mild, medium, excessive, or other level ratings such as age.

The rating dimensions may be identified by an index. For example, the columns of the dimensions may be identified in a sequential order. Also, one or more rating level tags are added to the rating levels. The rating level tags identify each rating level within a rating dimension uniquely. For example, for an age dimension, the age of 10 may be identified by a first tag and the age of 13 may be identified by a second tag. A rating region table is then generated.

A rating region table may be hard-coded in the firmware of the receiver. The receiver may be able to access and download a new rating region table for the user to use to set blocking preferences. A content advisory description may be specified for any given program. For example, a user may use a user interface to specify different blocking preferences: the dimension may be specified along with a rating level for that dimension. The index for the dimension may be saved along with the rating level tag for the level. When a given piece of content is received, it is analyzed to determine if it should be blocked based on the saved dimension index and the rating level tag. If the content is acceptable, it is not blocked, and if it is not acceptable, then it is blocked.

Using the rating level tag to identify a rating level within a dimension allows changes to be made to the region rating table. For example, if an index was used, such as the index of (2,1) to indicate a rating level in the table at the column #2 and row #1, if another row was added into the region rating table to shift the rows down or up, the index (2,1) may block the wrong content. The rating level tags may always be associated with the desired rating level even if the rating levels are moved in the table. Thus, using the rating level tag, the correct rating level within a dimension may be identified and the correct content is blocked without creating unwanted blocking behavior and viewer confusion.

A further understanding of the nature and the advantages of particular embodiments disclosed herein may be realized by reference of the remaining portions of the specification and the attached drawings.

BRIEF DESCRIPTION OF THE DRAWINGS

FIGS. 2A and 2B depict different versions of region rating tables according to one embodiment.

DETAILED DESCRIPTION OF EMBODIMENTS

Figure 1:
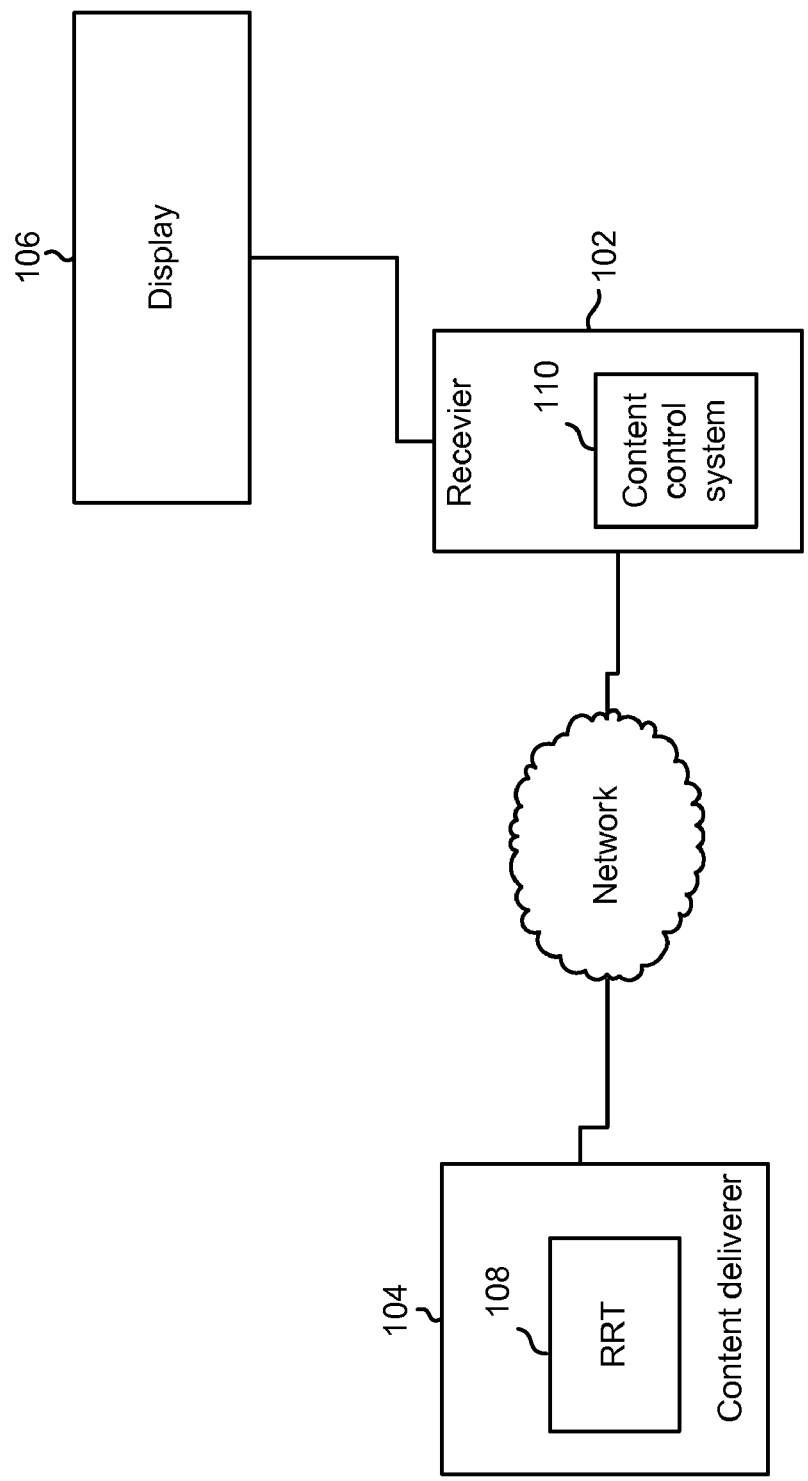
FIG. 1 depicts an example of a content advisory system according to one embodiment.

FIG. 1 depicts an example of a content advisory system 100 according to one embodiment. As shown, a receiver 102, content deliverer 104, and display device 106 are provided. It will be understood that many content deliverers 104, receivers 102 and display devices 106 may be appreciated along with other components of a content delivery system.

In one embodiment, receiver 102 may be a set-top box, personal computer, media gateway, or other computing device that can receive content. Receiver 102 may include a decoder/encoder that is able to receive content and display it on display device 106. Display device 106 may be any device that can display content, such as a television, monitor, cellular phone, personal computer, etc.

Content deliverer 104 may be configured to deliver content to receiver 102. Content deliverer 104 may be part of a service provider network that delivers video to receivers 102. For example, content deliverer 104 may be part of an internet protocol television (IPTV) network or any other network for digital delivery of content. The content delivered may be video-on-demand (VOD), streaming video, etc.

A region rating table (RRT) 108 is used to define ratings for content. These ratings may be used by a user to define which content should be blocked. For example, a V-chip technology may be used to apply blocking preferences. In one example, television shows, movies, video games, and other content can be blocked. Region rating table 108 may be further described below.

A content control system 110 is configured to use region rating table 108 to allow users to set preferences that can block content. A user may set a content blocking description using ratings found in region rating table 108. When content is received, it includes a content advisory descriptor (CAD) that assigns a rating to the content. Based on the rating in the content advisory descriptor, content control system 110 may block the content. For example, a user may set blocking preferences to block any content that is rated at age 13 or above. If the CAD for the content indicates it is rated at age 13 or above, it can be blocked.

Region rating table 108 defines those elements that can be rated for content and the possible amounts of those elements that might be present in content. System 100 supports a number of tables 108. For example, different rating regions correspond to different geographic areas, such as different countries may have different region rating tables.

FIGS. 2A and 2B depict different versions of region rating tables 108 according to one embodiment. Region rating table 108 may be structured as a two-dimensional array. Although region rating table 108 is shown as a 2-dimensional array, it will be understood a data structure underlying the table may be represented in different forms. The data in region rating table 108 is used to construct a user interface that allows a user to select blocking preferences.

Columns 202 may be rating dimensions that correspond to a parameter that can be rated. For example, the parameters may be violence, sexual content, age, MPAA movie rating, or other parameters. Rows 204 define rating levels that correspond to a different amount of the parameter of the type indicated by the corresponding dimension. For example, for a violence dimension, three different rating levels may be provided: mild, medium, and excessive violence.

Receivers 102 download region rating table 108. The aspect of downloadability refers to an attribute of construction of the region rating table that allows receiver 102 to create a meaningful and functional user interface for that region rating table by processing the content of the region rating table. For example, different syntaxes of a data structure for region rating table 108 may be used. These structures define the two-dimensional array containing data such as the example shown in FIGS. 2A and 2B.

Conventionally, receivers 102 identified content by an index as defined by the columns and rows of region rating table 108. For example, a reference of (2, 1) indicates that an age dimension in column 202-2 and the 13-age or above rating level in row 204-1 has been specified. Conventionally, the index value is hard coded when a user selected the blocking level. For example, when content is received, the blocking of the content is determined based on the index of (2, 1) in region rating table 108. Once a user establishes a blocking level, receiver 102 keeps track of the setting by storing the index value for each dimension for region rating table 108. If changes are made to region rating table 108 and the change were to involve shifting one of the rating levels up or down, the settings in receiver 102 for the blocking level would not track the shift and the index value would end up pointing at a different table entry than it did with the previous version of region rating table 108. This may present problems when changes to region rating table 108 occur. As a change to region rating table 108 is made, a new version may be downloaded to receiver 102. FIG. 2A shows a version 0 of region rating table 108 that includes the age dimension as having levels 7, 13, 16, and 18 years of age. As shown in FIG. 2B, a change is made to region rating table 108, resulting in a version 1, which defines age levels 7, 10, 13, 16, and 18 years of age. After the new region rating table 108 is downloaded, the index of (2, 1) is for age 10 or above and the age levels of 13, 16, and 18 have been shifted down. If a user set preferences that were stored as the index value of (2, 1), content rated at age 10 or above would be blocked; however, a user wants to block only age 13 or above.

Particular embodiments provide rating tags 206 that allow rating levels in rating dimensions to be uniquely identified. For example, a rating tag 206-1 is used to identify the rating level of age 13 or above in the age dimension. Thus, when the age level of 10 is added and the index changes, age level 13 can still be identified. It avoids the user having to alter the user preferences for blocking when changes to region rating table 108 occur.

Tags 206 are unique to rating levels in each dimension. Thus, tags can follow the rating levels even if changes to the rating levels are made in table 108. Receiver 102 can track rating tags 206 and thus block the correct content using the tag value rather than the index. For example, a user may set a preference for blocking age 13 or above content. Receiver 102 records this preference as index 2 for the dimension and tag 206-1. Tags may also be used to designate dimensions instead of using index numbers. However, new dimensions may be added at the end of the table and not in the middle of the table such that using the index positions is sufficient. In contrast, it is more likely that rating levels are inserted in between other levels because of continuity (i.e., age 10 naturally goes in between age 7 and 13 in a sequence). When version 1 of the table is downloaded, index 2, tag 206-1 still points to age 13 or above even though the rating level has been shifted down to index (2, 2). The proper rating level is thus still blocked and a user does not need to reconfigure the blocking settings.

Figure 2C:
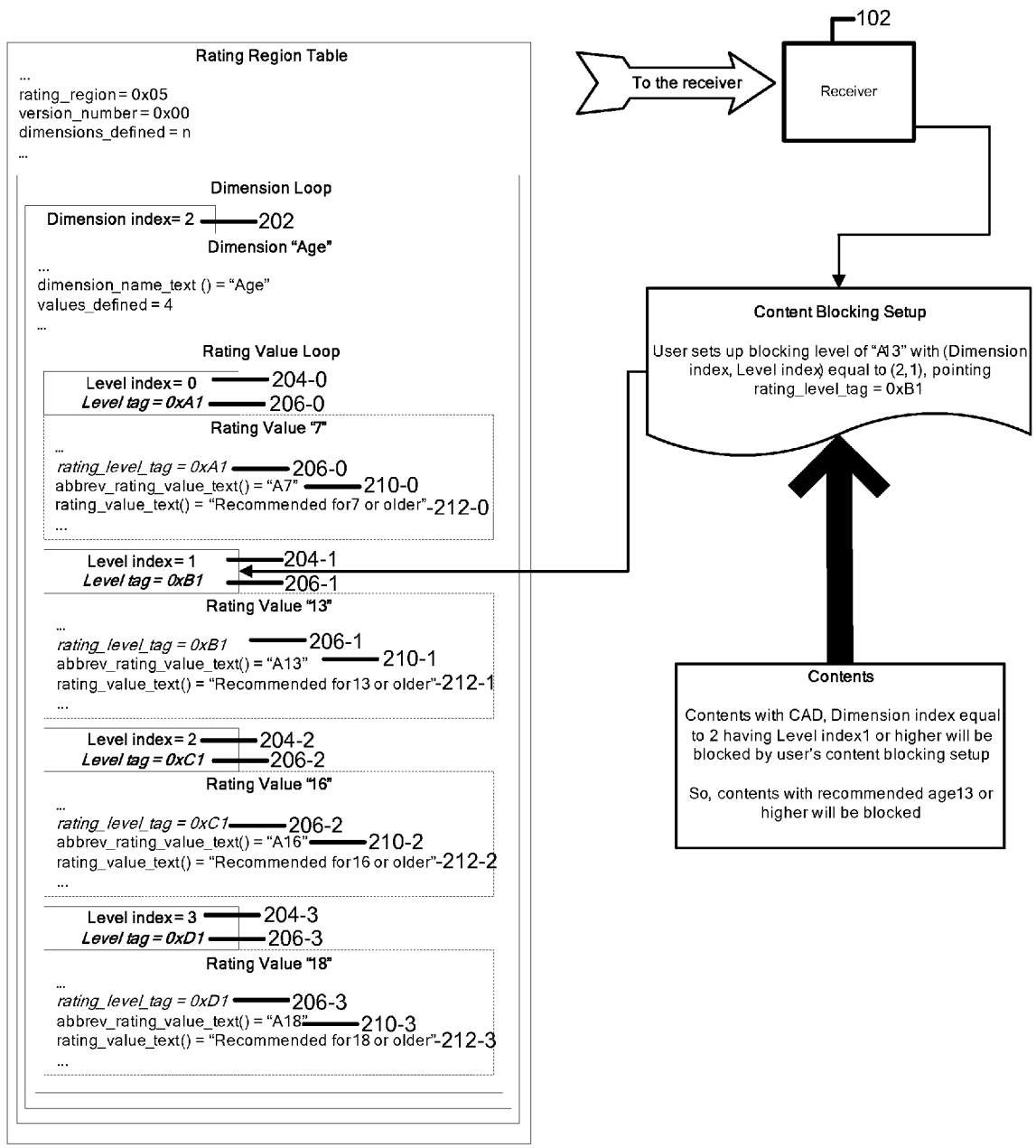
FIGS. 2C and 2D shows examples of data structures for region rating tables.

FIG. 2C shows an example for a region rating table 108. As shown, a dimension 202 of index=2 is provided. Different rating level 204 index values are also provided for each rating level. The abbreviated rating value 210 is shown. This is an abbreviation of the rating level and may be used by an interface to display the ratings. The rating value text 212 describes the rating level. This text may be used to describe the rating levels in an interface to allow a use to select a level in his/her blocking preferences. Each rating level includes a value for a rating level tag 206. As seen, each rating level has a unique value within the dimension.

Figure 2D:
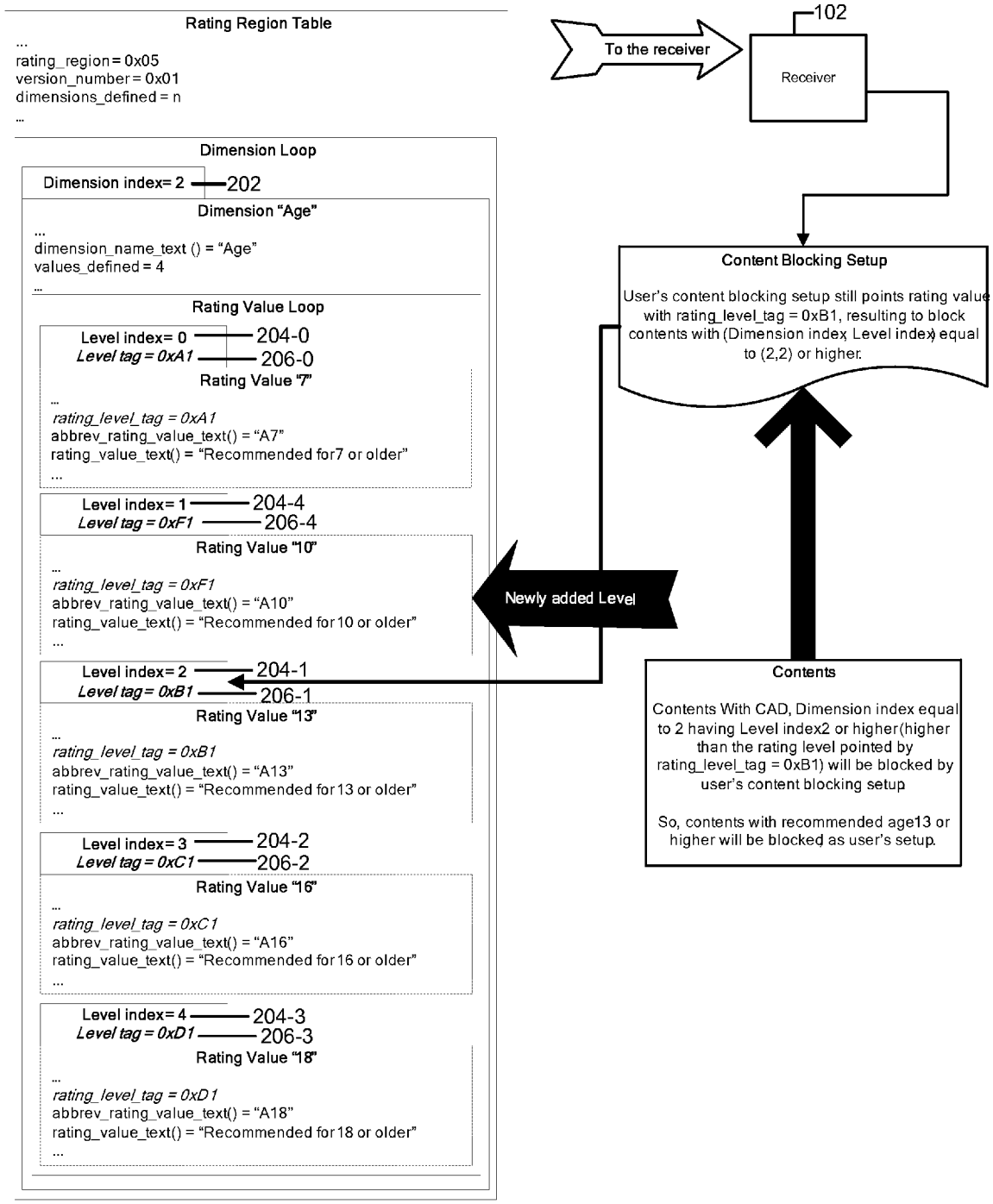

FIG. 2D shows an example of a data structure for a region rating table 108. As shown, a newly-added level of a rating value of "10" has been added in row 204-1. This newly-added row has pushed rating levels 13, 16, and 18 down to a level index of 2, 3, and 4 respectively. If the conventional way of blocking content was used with an index of (2, 1), then rating value 10 would be blocked. This blocks content for ages 10 or older. However, if instead the rating level tag of 0xB1 is used to identify the level, the rating level of 13 can be identified, which blocks content for age 13 or older.

Figure 3:
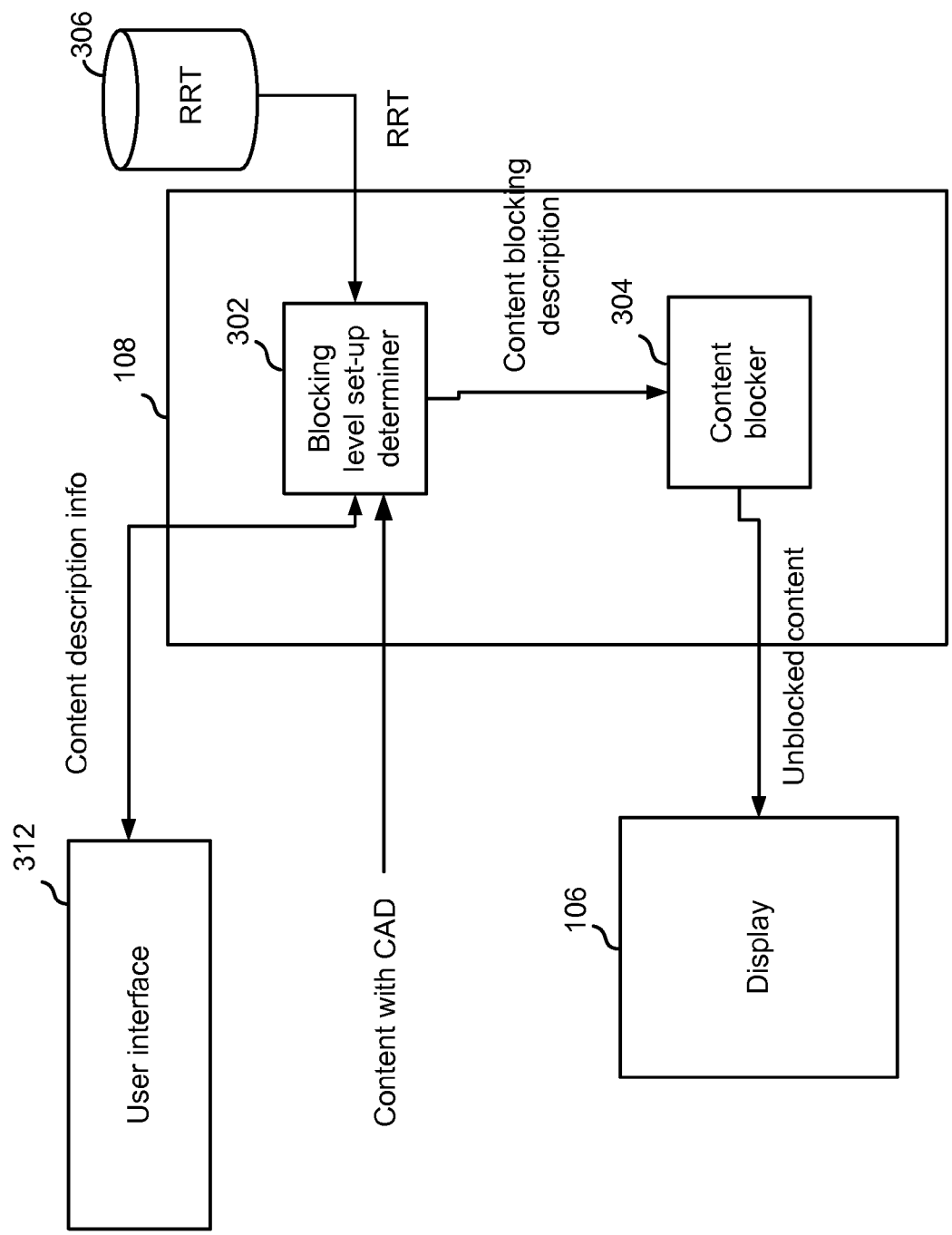
FIG. 3 discloses a more detailed embodiment of content control system according to one embodiment.

FIG. 3 discloses a more detailed embodiment of content control system 108 according to one embodiment. As shown, a blocking level set-up determiner 302, a content blocker 304, and a database 306 are provided. Blocking level set-up determiner 302 is configured to allow a user to set up blocking levels for content. A user interface 312 may be provided to a user that allows the user to select different ratings. For example, blocking level set-up determiner 302 may use a region rating table 108 that has been downloaded to database 306 to output a set of blocking choices to a user. Information may be displayed on user interface 312 and the user may specify which content blocking preferences are desired. For example, the user may specify different dimensions and rating levels that should be used to block content. In one example, content that is rated with an age of 13 or above can be specified.

When preferences are set, blocking level set-up determiner 302 generates a content blocking description that stores the user's preferences. For example, the index value for the dimension is saved along with the rating level tag value. Instead of the index value for the row, the tag value is saved instead. The index value for the row may also be saved in another embodiment.

Content blocker 304 is configured to block content based on the content blocking description. Content is received from content deliverer 104. The content may include a content advisory descriptor (CAD). The content advisory descriptor describes ratings that have been applied to the content. For example, the content may be rated at age 13 or above. The CAD may reference columns and rows in the region rating table. For the dimension, it may reference the index value of the dimension. For the rating value within the dimension, it may reference the rating level tag.

Content blocker 304 applies the content blocking description to the content advisory descriptor to determine if the content should be blocked or not. For example, if the content advisory descriptor includes a dimension and rating level tag associated with content that should be blocked, then the content is blocked. For example, if the content includes the dimension of 2 and a rating level tag of 0xB1, then the content is blocked. Accordingly, no changes in the rows of region rating table 108 affect whether or not the correct content is blocked. Because the rating level tag is unique to each dimension, the correct rating level that the user set preferences for can be identified. Thus, user preferences do not need to be reset when changes to region rating table 108 are provided. This is convenient for a user because continually readjusting the preferences is undesirable, and may not cause confusion if the user had no changes to the rating level the user had selected (e.g., age 13 or above).

Figure 4:
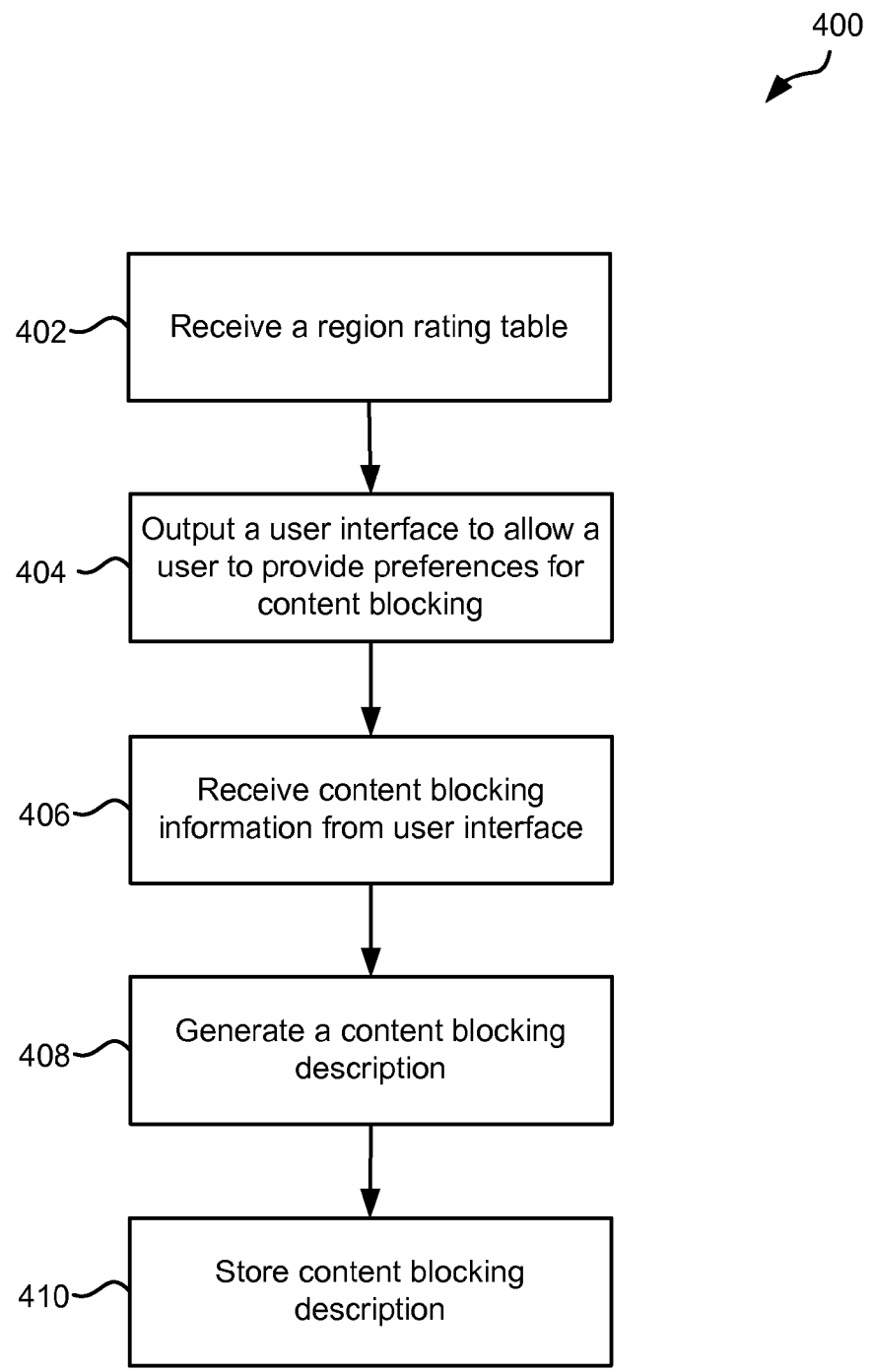
FIG. 4 depicts a simplified flowchart of a method for generating a content blocking description according to one embodiment.

FIG. 4 depicts a simplified flowchart 400 of a method for generating a content blocking description according to one embodiment. In step 402, receiver 102 receives a region rating table 108. In step 404, receiver 102 outputs a user interface 312 to allow a user to provide preferences for content blocking. The user may then interact with the interface to determine which settings should be applied to blocked content.

In step 406, receiver 102 receives content blocking information from user interface 312. The content blocking information may include a dimension and also a rating level tag that defines a blocking level that the user desires.

In step 408, receiver 102 generates a content blocking description. The content blocking description defines the dimension and tag for the rating level that has been defined by the user. In step 410, the content blocking description is stored.

Figure 5:
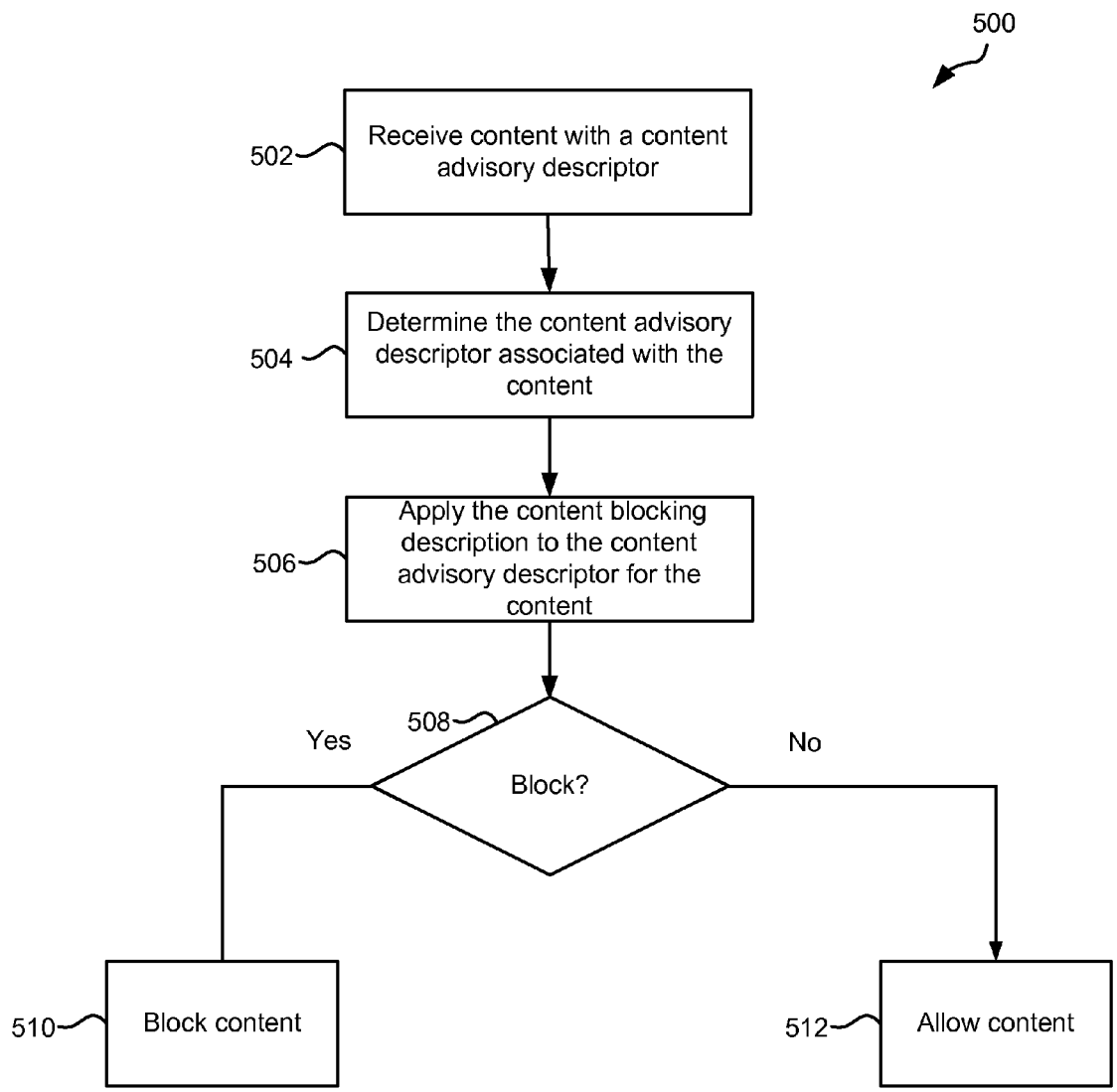
FIG. 5 depicts a simplified flowchart of a method for blocking content according to one embodiment.

FIG. 5 depicts a simplified flowchart 500 of a method for blocking content according to one embodiment. In step 502, receiver 102 receives content with a content advisory descriptor. In step 504, receiver 102 determines the content advisory descriptor associated with the content. In step 506, the content blocking description is applied to the content advisory descriptor for the content. For example, it is determined if the content is in the rating level that should be blocked. In step 508, it is determined if the dimension and tag apply to the content advisory descriptor. If so, step 510 blocks the content. If not, step 512 allows the content to be displayed.

Although the description has been described with respect to particular embodiments thereof, these particular embodiments are merely illustrative, and not restrictive. Although a region rating table is described, it will be understood that any data structure defining dimensions and rating levels may be used.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for processing a region rating table, the method comprising:
    receiving a region rating table including dimension information for one or more rating dimensions, each of the rating dimensions being associated with one or more rating levels, and one or more rating level tags for the one or more rating levels, wherein each of the rating level tags is unique to each rating level associated with each rating dimension, the one or more rating level tags allowing a content advisory system to reference rating levels for a rating dimension uniquely even upon changes to index positions for the rating levels in the one or more rating dimensions;
    storing the region rating table;
    determining, by a processor, a content blocking description for a content advisory system, the content blocking description specifying one or more rating level tags for each rating level associated with each rating dimension; and
    using the region rating table to block content using the one or more rating level tags in the content blocking description.

2. The method of claim 1, further comprising:
    receiving content including a content advisory description, the content advisory description rating the content using a rating level tag associated with a rating dimension;
    determining if the rating level tag for the rating dimension in the content advisory description indicates the content should be blocked based on the rating level tag for the rating dimension in the content blocking description; and
    blocking the content from being displayed if the content includes the rating level tag.

3. The method of claim 2, wherein determining the content blocking description comprises:
    receiving a selection of a content category to be blocked; and
    determining a rating dimension and rating level tag associated with the content category to block.

4. The method of claim 1, further comprising outputting an interface to a user displaying the one or more rating dimensions and one or more rating levels that can be selected to block content based on data in the region rating table.

5. The method of claim 1, further comprising:
    receiving a second version of the region rating table, the second version including a new rating level for the rating dimension causing the rating level index position to change for the rating dimension; and
    blocking content using the rating level tag for the rating dimension even though the position for the rating level is changed.

6. The method of claim 5, wherein the new rating level causes the rating level associated with the rating level tag to move up or down an index position.

7. A method comprising:
    determining, by a processor, dimension information for one or more rating dimensions in a region rating table, the region rating table used for content advisory system;
    determining rating level information for one or more rating levels for the one or more rating dimensions, each of the rating dimensions being associated with one or more rating levels;
    adding one or more rating level tags to the one or more rating level information for the one or more rating levels, wherein each of the rating level tags is unique to each rating level associated with each rating dimension, the one or more rating level tags allowing a content advisory system to identify rating levels for a rating dimension uniquely even upon changes to index positions for the rating levels in the one or more rating levels for the one or more dimensions;
    generating a region rating table using the dimension information, rating level information and the one or more rating level tags; and
    determining a content blocking description for a content advisory system, the content blocking description specifying one or more rating level tags for each rating level associated with each rating dimension.

8. The method of claim 7, further comprising sending the region rating table to a receiver for use in enforcing content advisory decisions.

9. The method of claim 7, wherein the region rating table comprises a data structure including the dimension information and the rating information.

10. The method of claim 7, further comprising:
    adding a new rating level in the one or more rating levels for a rating dimension;
    adding a new rating level tag to the new rating level, wherein the new rating level shifts a portion of the rating levels for the rating dimension to other index positions of the table,
    wherein the rating level tags are usable to identify the rating levels that are selected in the rating dimension even though index positions of the rating levels have changed.

11. An apparatus configured to process a region rating table comprising:
    one or more processors; and
    logic encoded in one or more tangible media for execution by the one or more processors and when executed operable to:
    receive a region rating table including dimension information for one or more rating dimensions, each of the rating dimensions being associated with one or more rating levels, and one or more rating level tags for the one or more rating levels, wherein each of the rating level tags is unique to each rating level associated with each rating dimension, the one or more rating level tags allowing a content advisory system to identify rating levels for a rating dimension uniquely even upon changes to index positions for the rating levels in the one or more rating dimensions;
    store the region rating table;
    determining a content blocking description for a content advisory system, the content blocking description specifying one or more rating level tags for each rating level associated with each rating dimension; and
    use the region rating table to block content using the one or more rating level tags in the content blocking description.

12. The apparatus of claim 11, wherein the logic if further operable to:
    receive content including a content advisory description, the content advisory description rating the content using a rating level tag associated with a rating dimension;

determine if the rating level tag for the rating dimension in the content advisory description indicates the content should be blocked based on the rating level tag for the rating dimension in the content blocking description; and block the content from being displayed if the content includes the rating level tag.

13. The apparatus of claim 12, wherein logic operable to determine the content blocking description comprises logic further operable to:

receive a selection of a content type to be blocked; and determine a rating dimension and rating level tag associated with the content type to block.

14. The apparatus of claim 11, wherein the logic when executed is further operable to output an interface to a user displaying the one or more rating dimensions and one or more rating levels that can be selected to block content based on data in the region rating table.

15. The apparatus of claim 11, wherein the logic when executed is further operable to:

receive a second version of the region rating table, the second version including a new rating level for the rating dimension causing the rating level index position to change for the rating dimension; and block content using the rating level tag for the rating dimension even though the position for the rating level is changed.

16. The apparatus of claim 15, wherein the new rating level causes the rating level associated with the rating level tag to move up or down an index position.

17. An apparatus comprising:

one or more processors; and logic encoded in one or more tangible media for execution by the one or more processors and when executed operable to:

determine dimension information for one or more rating dimensions in a region rating table, the region rating table used for content advisory system;

determine rating level information for one or more rating levels for the one or more rating dimensions, each of the rating dimensions being associated with one or more rating levels;

add one or more rating level tags to the one or more rating level information for the one or more rating levels, wherein each of the rating level tags is unique to each rating level associated with each rating dimension, the one or more rating level tags allowing a content advisory system to identify rating levels for a rating dimension uniquely even upon changes to index positions for the rating levels in the one or more rating levels for the one or more rating dimensions;

generate a region rating table using the dimension information, rating level information and the one or more rating level tags for each rating level associated with each rating dimension; and determining a content blocking description for a content advisory system, the content blocking description specifying one or more rating level tags.

18. The apparatus of claim 17, wherein the logic when executed is further operable to send the region rating table to a receiver for use in enforcing content advisory decisions.

19. The apparatus of claim 17, wherein the region rating table comprises a data structure including the dimension information and the rating information.

20. The apparatus of claim 17, wherein the logic when executed is further operable to:

add a new rating level in the one or more rating levels for a rating dimension;

add a new rating level tag to the new rating level, wherein the new rating level shifts a portion of the rating levels for the rating dimension to other index positions of the table, wherein the rating level tags are usable to identify the rating levels that are selected in the rating dimension even though index positions of the rating levels have changed.

* * * * *